Patented Feb. 15, 1927.

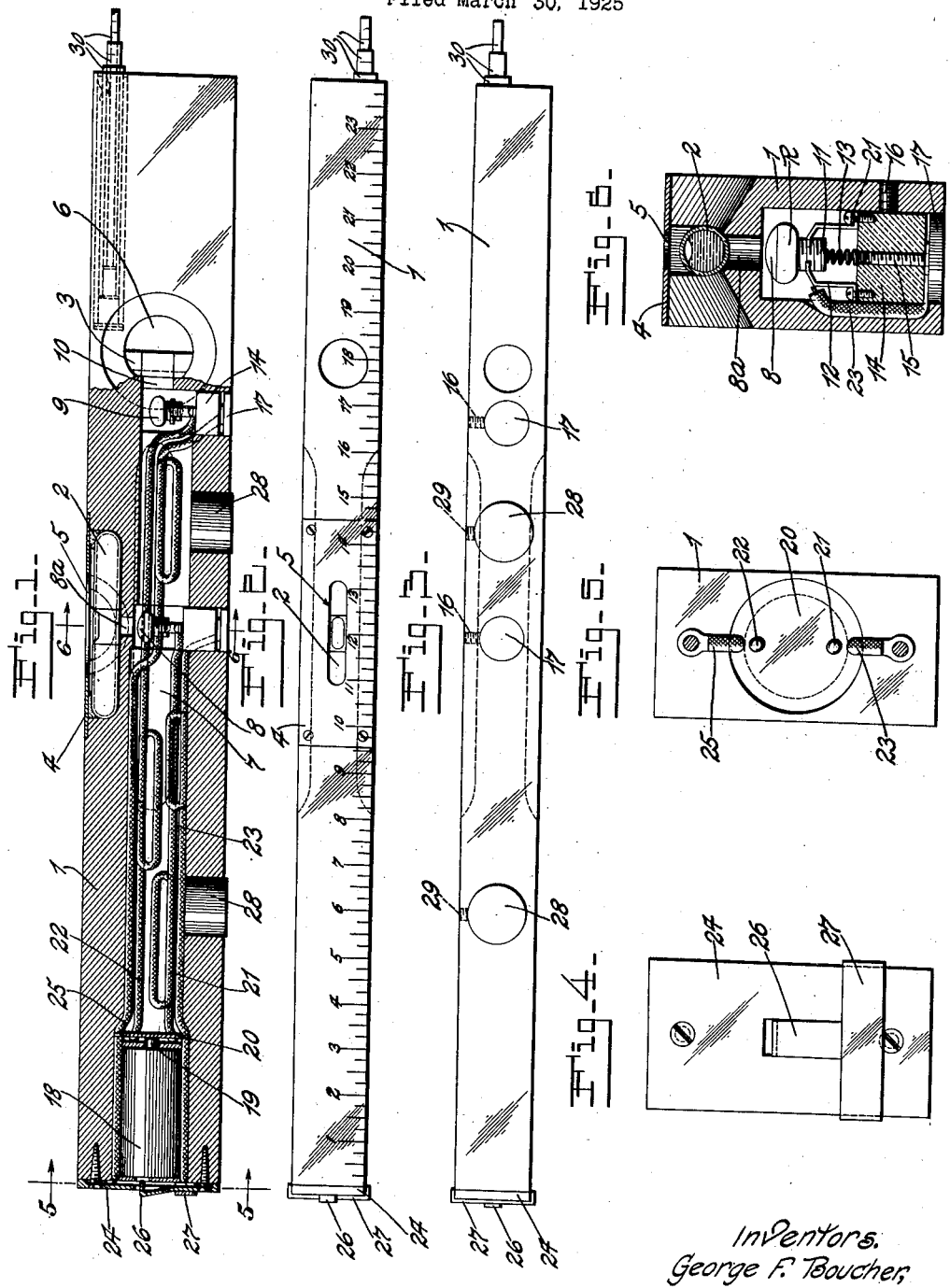

1,617,937

UNITED STATES PATENT OFFICE.

GEORGE F. BOUCHER, GEORGE H. PRICE, AND FREDERICK FOSTER, OF ST. LOUIS, MISSOURI.

ILLUMINATED LEVEL.

Application filed March 30, 1925. Serial No. 19,234.

This invention relates to illuminated levels.

An object of the invention is to provide novel means for illuminating the bubble glasses of levels, and means for supporting the levels vertically upon metallic objects.

Another object of the invention is to provide a level embodying the structure mentioned and having a measuring scale on one side thereof.

Other objects will appear from the following description, reference being made to the drawing in which—

Fig. 1 is a sectional view of a level containing the present invention.

Fig. 2 is a side elevation showing the measuring scale.

Fig. 3 is a side elevation showing the magnetized supporting elements in the level.

Fig. 4 is an end view showing the switch device controlling the lighting circuits.

Fig. 5 is a view taken on the line 5—5 of Fig. 1.

Fig. 6 is a cross sectional view on the line 6—6 of Fig. 1.

The stock or body 1 of the level is made of any appropriate species of wood and is equipped with the usual bubble glasses 2 and 3. The bubble glass 2 is protected by a metallic plate 4 having a longitudinal sight slot 5 therein, and the inner side of said plate is highly polished or coated with quicksilver or the like to concentrate and reflect the rays of light from the adjacent illuminating lamp. The bubble glass 3 extends across a sight opening 6 in the level body, the wall of said opening being equipped with reflecting means to concentrate and reflect the rays of light from the adjacent lamp.

The body or stock 1 is provided with a longitudinal bore 7 through which the circuit wires to the lamp extend. The lamp 8 illuminates the bubble glass 2 through a hole 8ª, and the lamp 9 illuminates the bubble glass 3 through a hole 10. Each of said lamps has a reflector R thereon and is supported in a novel manner permitting adjustment to proper relationship with respect to the remaining structure and protecting the lamp from damage that would otherwise result from jars and blows to which the level might be subjected. The threaded sleeve 11 of each lamp is screwed between the converging ends of a pair of spring arms 12 which serve as a socket therefor, the end of said sleeve contacting with the end of a coiled spring 13, the opposite end of which is secured to a plug 14 imbedding the terminal contact member 15. The lamp plugs 14 are held within the level by removable screws 16 and the outer ends of the recesses in which the plugs are mounted are closed by discs 17 screwed upon the members 15.

A dry cell battery 18 is removably mounted in one end of the level 1 and has the extension 19 thereof in contact with a metallic plate 20 from which a circuit wire 21 leads to connection with one of the spring arms 12 of the lamp 8, and a circuit wire 22 leads to a connection with one of the spring arms 12 of the lamp 9. A circuit wire 23 for the lamp 8 leads from the terminal connecting member 15 of said lamp to connection with a metallic plate 24 secured to the end of the level and closing the recess in which the battery 18 is mounted; and a similar circuit wire 25 leads from the member 15 of the lamp 9 to connection with said plate 24. The plate 24 is out of contact with the metallic end of the battery and is formed with a resilient tongue 26 designed and adapted to be pressed into contact with the battery to close the circuits to both of the lamps, as will be understood by reference to Fig. 1. A slide 27 has its ends bent to enclose the edges of the plate 24 to maintain slidable connection therewith and may be moved to position to hold the tongue 26 pressed against the battery 18 to maintain closed circuits to the lamps. When the slide 27 is in the position shown the resilient tongue 26 moves out of contact with the battery and opens the circuits to the lamps.

A pair of magnetized bodies 28 are imbedded in the level so that when the level is placed against any metallic object the magnets 28 will support the level without the aid of the hand of the user, thus permitting the user to step back for clearer and better observation. The magnets 28 are removable and are retained in place by removable screws 29.

The faces of the level are provided with measuring scales, one of which is shown in Fig. 2, so that the device may be used as a measuring instrument as well.

In order to make the device complete as a measuring instrument a series of telescoping measuring units 30 are mounted in one end of the body 1 and are withdrawable successively to produce a projected or extended measuring scale of any desired length. There may be as many of the telescoping units 30 as needed by the person using the instrument. One or more sides of the units 30 is provided with a measuring scale. As shown in Figs. 1, 2 and 3 a number of the units 30 are slightly projected beyond the end of the body 1, but when out of use the units 30 are entirely within the body 1 and their ends even with the end of said body.

The mode of use and operation of the invention will be clear to those skilled in the art, without further description. We contemplate the use of such materials in the manufacture of the device as will best serve the purposes for which the invention is intended. We do not restrict ourselves unessentially, but what we claim and desire to secure by Letters Patent is:—

1. An instrument for locating vertical planes and measuring the height of and the distance between points on said vertical planes and the horizontal distance between points on different vertical planes, comprising a body, a device supported in and visible from each of two opposite sides of the body for locating vertical planes, a device visibly supported in another side of the body for locating horizontal planes, illuminating means adjacent each of the devices, a measuring scale extending throughout the length of the body on the same side thereof in which said second device is visible, and an extensible measuring element comprising a plurality of telescopic units normally located within one end of the body adjacent the scale.

2. An instrument for locating vertical planes and measuring the height of and the distance between points on said vertical planes and the horizontal distance between points on different vertical planes, comprising a body, a device supported in and visible from each of the two opposite sides of the body for locating vertical planes, a device visibly supported in another side of the body for locating horizontal planes, a measuring scale extending throughout the length of the body on the same side thereof in which said second device is visible, an extensible telescopic measuring element located in the body of the instrument and adjacent the scale adapted to form a continuation thereof, a lamp positioned adjacent the first device and the extensible element, and a second lamp adjacent the second device and the scale.

3. An instrument for locating vertical planes and measuring the height of and the distance between points on such vertical planes and the horizontal distance between points on different vertical planes, comprising a body, a device supported in and visible from each of the two opposite sides of the body for locating vertical planes, a device visibly supported at another side of the body for locating horizontal planes, a measuring scale extending through the length of the body on the same side thereof in which said second device is visible, an extensible measuring element normally located within one end of the body of the instrument adjacent the scale comprising a plurality of telescopic units forming a continuation of the scale, illuminating means positioned within the body of the instrument adjacent each of the plane locating devices, said illuminating means comprising electric lamps supported adjustably upon removable plugs inserted through the base of the instrument and carrying contacts for the lamps and means to light the lamps.

GEORGE F. BOUCHER.
GEORGE H. PRICE.
FREDERICK FOSTER.